United States Patent

[11] 3,628,669

| [72] | Inventors | Charles L. McKinnis; |
| | | Charles I. Cohen, both of Granville, Ohio |
| [21] | Appl. No. | 1,940 |
| [22] | Filed | Dec. 22, 1969 |
| [45] | Patented | Dec. 21, 1971 |
| [73] | Assignee | Owens-Corning Fiberglas Corporation |
| | | Original application May 3, 1968, Ser. No. 726,297. Divided and this application Dec. 22, 1969, Ser. No. 1,940 |

[54] SEMIPERMEABLE MEMBRANES
2 Claims, 2 Drawing Figs.

| [52] | U.S. Cl. | 210/510 |
| [51] | Int. Cl. | B01d 39/20, B01d 31/00 |
| [50] | Field of Search | 210/22, 23, 321, 490, 491, 500 |

[56] References Cited
UNITED STATES PATENTS

| 3,170,867 | 2/1965 | Loeb et al. | 210/500 X |
| 3,342,729 | 9/1967 | Strand | 210/500 X |
| 3,442,389 | 5/1969 | Mendelson | 210/491 X |
| 3,498,909 | 3/1970 | Littman | 210/321 X |
| 2,106,744 | 2/1938 | Hood et al. | 65/31 X |

OTHER REFERENCES

" Membrane Processes Move Toward Broad Use," from Chemical & Engineering News, July 8, 1966, pp. 46– 48.
" Salt Rejection by a Porous Glass," from Science, Vol. 151, Jan. 14, 1966, pp. 194 & 195.

*Primary Examiner*—Frank A. Spear, Jr.
*Attorneys*—Staelin & Overman and Ronald C. Hudgens

ABSTRACT: A rigid semipermeable membrane of essentially silica and apparatus and method for making it that includes leaching an inorganic glass film.

PATENTED DEC 21 1971 3,628,669
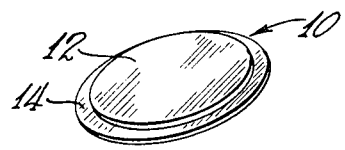
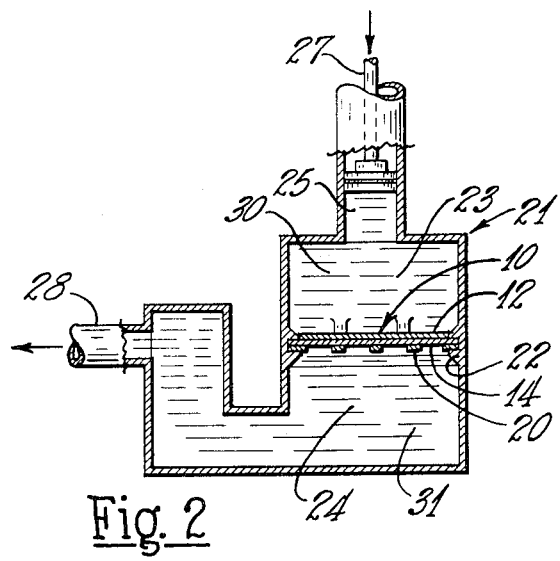
CHARLES L. MCKINNIS &
CHARLES I. COHEN
INVENTORS
BY
*[signature]*
ATTORNEYS

SEMIPERMEABLE MEMBRANES

This is a division of copending application Ser. No. 762,297, filed May 3,1968, now abandoned.

BACKGROUND OF THE INVENTION

The invention relates to a selective membrane and the method and apparatus for making it.

More particularly the invention relates to an essentially silica selective or semipermeable membrane.

Heretofore most commercial semipermeable membranes have been organic cellulose type membranes such as cellulose acetate and nitrocellulose. The physical characteristics of such cellulose type membrane give rise to difficulties that limit their use and effectiveness.

The organic nature of the cellulose type membranes limits their use primarily to aqueous solutions. Many organic solvents such as acetones, esters, ketones, and many alcohols attack cellulose type membranes to dissolve them. Even in aqueous solutions the cellulose type membranes can normally operate only in a narrow pH range, e.g., from 4 to 6. In many cases the cellulose type membranes require chemical modification to work in a particular chemical environment. In contrast, many solvents that attack cellulose type membranes do not affect the semipermeable membranes of the instant invention; moreover, the semipermeable membrane of the invention operates in aqueous solutions over a wider pH range.

Many types of micro-organisms attack the organic cellulose-type membranes. Moreover, the cellulose type membranes can hydrolyze under operating pressures to the point where they structurally fail.

Because of their organic structure, cellulose-type membranes are not completely dimensionally stable. These membranes are flexible and are characterized by linear polymer chains having only some degree of cross-linking between them. During their use under conditions of pressure the organic cellulose type membranes lose their dimensions with an ensuing distortion of the pore system. On the other hand, the semipermeable membranes of the present invention have a rigid structure that gives long term dimensional stability under pressure and substantially uniform solute rejection values.

SUMMARY OF THE INVENTION

An object of the present invention is an improved selective membrane and method and apparatus for making it.

Another object of the present invention is an inorganic selective or semipermeable membrane that removes substantially all dissolved matter from fluids diffusing through it.

Yet another object of the present invention is to provide a selective or semipermeable membrane compatible with a wide range of chemical environments.

These and other objects are attained through the use of a selective or semipermeable membrane that is an integral porous structure comprising essentially silica, the membrane being made by leaching certain thin inorganic glass films.

The selective membrane of the invention takes its origin from the particular structure of the inorganic glass used. Suitable inorganic glass must possess a fine structure having a point to point chemical variation where the composition of the leachable components follows a continuous function with a maximum and minimum concentration on the order of 50 angstroms. The leachable components include silica-rich network and an alkaline earth-rich network. The alkaline earth-rich network is removed, e.g. leaching, to leave behind a highly porous membrane structure of essentially silica. This integral silica structure is a membrane possessing a coherent pore or channel network where the individual pores of the network are exceedingly small in diameter. Thermal treatment of the solid inorganic glass prior to leaching modifies the maximum and minimum concentrations and the distance between such maximum and minimum concentrations to produce a porous membrane, which is essentially silica having a pore diameter greater than the inorganic glass having no such thermal treatment. Thus, selective thermal treatment of the inorganic glass prior to leaching can control the membrane's pore size.

The semipermeable membrane of the invention provides an inorganic selective membrane that can be used in a wider variety of chemical environments than known organic semipermeable membranes, especially cellulose type membranes. Because of its inorganic structure, the semipermeable membranes of the invention resist the attack of most solvents. Additionally, the membranes find use in aqueous solutions over a wider range of pH, e.g., 2–8. Moreover, the inorganic structure of the semipermeable membrane of the invention is ideal in ultrafiltration applications for separating micro-organisms such as viruses from liquids in which they are found. Advantageously, the fine structure of the glass employed to make the glass film provides, upon leaching, a membrane having an extremely small pore or channel size, which under ultrafiltration conditions removes or separates substantially all except the most minute dissolved matter.

The semipermeable inorganic membrane of the invention finds use as an osmotic or reverse osmotic membrane ideal for renovating water, e.g., recovery of fresh water from sea water.

BRIEF DESCRIPTION OF THE DRAWINGS

FIG. 1 is a view in perspective showing a supported selective membrane according to the principles of the invention.

FIG. 2 is a somewhat schematic view in elevation of apparatus of an ultrafiltering process according to the principles of the invention.

DESCRIPTION OF THE PREFERRED EMBODIMENTS

U.S. Pat. No. 2,509,805 issued to Games Slayter on May 30, 1950, shows apparatus for forming ribbons or continuous films of glass suitable for use in making the selective or semipermeable membrane of the invention. As disclosed in the patent, molten glass flows from a container of molten glass through a relatively long orifice or slot located in the bottom of the container. Pulling means attenuates the thin and relatively wide stream of molten glass flowing from the slot into an exceedingly thin continuous film or sheet of glass.

The selective or semipermeable membrance of the invention depends upon an inorganic glass with a fine structure having a point to point chemical variation where the composition of the leachable components follows a continuous function with a maximum and minimum concentration on the order of 50 angstroms. Examples of useful glass compositions suitable for producing a glass film from which the membrane of the invention may be made are as follows:

EXAMPLE I

|  | Wt. Percent |
|---|---|
| CaO | 16 to 19 |
| MgO | 3 to 6 |
| $Al_2O_3$ | 12 to 16 |
| $SiO_2$ | 52 to 56 |
| $B_2O_3$ | 9 to 11 |

EXAMPLE II

|  | Wt. Percent |
|---|---|
| $SiO_2$ | 60.0% |
| BaO | 22.0% |
| $B_2O_3$ | 18.0% |

EXAMPLE III

|  | Wt. Percent |
|---|---|
| CaO | 0.5% |
| $K_2O$ | 1.4% |
| $Li_2O$ | 0.5% |
| $Al_2O_3$ | 0.1% |
| $SiO_2$ | 73.8% |
| $B_2O_3$ | 22.8% |
| $Na_2O$ | 1.0% |

The structure of the glass film is to be distinguished from glass that exhibits distinct phase separation wherein there is an interface between the phases. The attenuated inorganic glass film of a glass composition having the required fine structure includes a silica-rich network and an alkaline earth-rich network in a microlevel beginning state of chemical separation that gives rise to two interconnected networks. Moreover, the separation growth is slower than the quenching rate of film production, e.g., film attenuation. Because there is a drastic temperature drop during attenuation of the inorganic glass film, chemical separation only begins.

During attenuation of the inorganic glass film the temperature of the glass may drop from a molten temperature of over 2,000° F. in the container to a temperature generally below 1,200° F. at only 6 to 8 inches from the bottom of the container.

While attenuated inorganic glass films suitable for making the selective membrane of the invention having a thickness in the range of from ten one-hundred-thousandths of an inch to one-hundred one-hundred-thousandths of an inch can be made by attenuating the film at the high linear rates of speed mentioned in U.S. Pat. No. 2,509,805, it has been useful to attenuate the films at a linear rate of speed of from 20 to 200 feet per minute, or slightly more, where the temperature of the molten glass in the container is from 2,100° to 2,400° F.

Removal of the alkaline-earth-rich components by leaching leaves an integral and porous membrane structure of essentially rigid silica, i.e., 96 percent to 99 percent silica. Normally the alkaline-earth-rich phase removal is accomplished by acid leaching, using an acid in which the alkaline-earth-rich components have much greater solubility than the silica-rich components and which leaves no insoluble residue. The rate of such component removal in an acid is determined by such things as the chemical nature of the acid itself, the acid concentration, temperature of the acid bath and the like.

Hot concentrated acid gives the highest rate of component removal. It has been found useful to employ heated 38 percent hydrochloric acid diluted with an equal weight of water at an initial temperature around 180° F.

The leached inorganic glass film is a semipermeable membrane typified by a highly hydrated rigid silica framework. The membrane possesses a hydrated, interconnected pore or coherent channel network occupying in the range of from 35 percent to 40 percent of the membrane's volume. The pore or channel size is in the range of from 30 to 50 angstroms in diameter. The water of hydration is believed to be located on the surface of the pore walls and is strongly held thereon by residual electrolytic forces.

The thinness of the inorganic glass film is important. The efficient removal of the alkaline-earth-rich, acid soluble component by leaching is increasingly difficult for film thicknesses greater than forty one-hundred-thousandths of an inch. Because the external, initially leached portions of an inorganic glass film having a thickness greater than forty one-hundred-thousandths of an inch apparently reduce the strength of the film to where it cannot accommodate the resultant stresses during leaching of the interior portions of the film, such films tend to fail during leaching. Further, because acceptable and useful flux rates through semipermeable membranes of the invention having a thickness greater than forty one-hundred-thousandths of an inch is greatly reduced and require exaggerated pressures, films of such thicknesses are not normally used. Moreover, an inorganic glass film less than ten one-hundred-thousandths of an inch is too fragile for handling. It is preferred that the selective membrane of the invention be made from suitable inorganic glass films having a thinness of from twenty to thirty one-hundred-thousandths of an inch.

Suitable cutting means may be employed to shape a portion of the attenuated continuous suitable inorganic glass film to desired dimensions. While one may use cutting dies, flame cutting and the like, the use of thermal imaging cutting apparatus is preferred to form the glass film into desired dimensions.

Because the inorganic glass film is delicate, a substrate is used to support it for handling. The film is normally placed in intimate supported relationship on the substrate prior to leaching the film. The intimate association of the substrate and film inhibits movement of the film on the substrate during leaching and subsequent thereto. While the film and substrate may be suitably secured together by adhesives such as solder glass to fix the inorganic glass film on the substrate, it has been found that the surface tension of water on the surface of a substrate such as glass fiber filter paper is sufficient to firmly hold the film on the paper during leaching and subsequent thereto.

Any suitable leaching methods may be employed to remove the alkaline earth-rich component for making the porous and essentially silica membrane of the invention.

FIG. 1 shows a circular composite structure 10 comprising a leached inorganic film 12, i.e., separation or semipermeable membrane, and supporting substrate 14 because the glass film can move somewhat on the substrate 14 during leaching, the substrate 14 is larger, i.e., has a larger diameter.

The substrate 14 is a porous structure having larger size pores or channels than that of the selective membrane 12. Moreover, while the pore size may remain constant throughout the entire volume of the substrate 14, a substrate having a coherent network of increasing port size at more remote positions from the surface of the substrate contacting the membrane 12 may be employed. Because the inorganic glass film from which the membrane is produced is normally placed in intimate supported relationship on the substrate 14 prior to leaching, the substrate 14 should be inert to acid. Glass fiber filter paper has proven to be an excellent supporting substrate for use with the membrane 12. Subjecting the glass filter paper to the acid used for leaching the inorganic glass film prior to combining the paper with the glass film provides a support permitting enhanced leaching of the film. Such exposure removes any portion of the filter paper, e.g., binders, that may detract from the leaching of the inorganic glass film. A standard glass fiber filter paper of one sixty-fourth to one-sixteenth of an inch thickness has given good results.

Thermal treatment of the inorganic glass film of the invention prior to removal of the alkaline-earth-rich component induces increased chemical separation of the leachable components to modify the maximum and minimum concentrations and the distance between such maximum and minimum concentrations. The thermal treatment of the inorganic glass film of the invention falls within a temperature range. It appears that the lower limit of induced chemical separation occurs within the range of from 1,200° F. to 1,340° F. When the inorganic glass film is subjected to such temperatures over a period of time, the leached glass film or essentially silica semipermeable membrane has a pore size of from generally 80 angstroms to 500 angstroms in diameter. The inorganic glass film has been treated as indicated with the ensuing membrane pore diameter as shown:

EXAMPLE V

| | |
|---|---|
| Temperature | 1,320° F. |
| Time | 72 hours |
| Pore diameter of membrane 300 angstroms | |

Time and temperature variations modify the pore diameter.

The upper limit is a visible region of separation in the range of from 1,340° F. to 1,380° F. The glass film appears somewhat opaque from the chemical separation. When one removes the alkaline-earth-rich component by leaching, there remains a porous and essentially silica membrane having a pore diameter in the range of from 500 to 800 angstroms depending upon the particular thermal treatment.

For example:

EXAMPLE VI

| | |
|---|---|
| Temperature | 1,380° F. |
| Time | 72 hours |
| Pore diameter of membrane 600 angstroms | |

Time and temperature variations modify the pore diameter.

FIG. 2 shows a somewhat schematic ultrafiltration, i.e., reverse osmosis, process employing the semipermeable membrane 12. The filter means comprises a porous support means 20 of adequate strength and made of things such as sintered metal or porous ceramic that supports the composite structure 10 of the inorganic membrane 12 and substrate 14 within a container 21. With the aid of a suitable sealing means 22 the composite structure 10 in intimate association on the support means 20 divides the container 21 into an upper compartment or chamber 23 and a lower compartment or chamber 24. An extension portion 25 communicates with the upper chamber 23. Associated with the extension portion 25 is a piston unit 27 moveable therein. A discharge 28 communicates with the lower chamber 24.

The upper chamber 23 holds a liquid 30 to be filtered through the semipermeable membrane 12, which forms a wall of upper chamber 23. The liquid 30 may be a liquid including dissolved organic solids such as sucrose in water. Also, the liquid 30 may be a liquid mixture such as an emulsion of oil and water or perhaps a liquid containing ionic solids such as sodium chloride in water.

The piston unit 27 moved by appropriate means exerts pressure on the liquid 30. When the unit 27 establishes sufficient pressure in excess of osmotic pressure on the liquid 30, diffusion through the membrane 12 occurs. Flow continues through the substrate 14 and support means 20. Filtered or treated liquid, denoted as 31, collects in the lower chamber 24. The collected filtered liquid 31 may leave the lower chamber 24 through the discharge 28. Components of the liquid 30 not passing through, i.e., rejected, by the membrane 12 remain in chamber 23.

One can produce a semipermeable membrane for particular ultrafiltering tasks. One need only thermally treat the inorganic glass film to modify the chemical separation of the leachable components to obtain a leached inorganic membrane having a desired pore diameter.

In view of the foregoing, it will be recognized that while particular embodiments of the invention have been shown, many modifications may be made within the scope of the invention; therefore, it is not the intent to limit the invention to the specific embodiments.

We claim:

1. A semipermeable membrane comprising;
    a leached inorganic glass film, the film including a silica-rich network and an alkaline-earth-rich network structure having a point to point chemical variation where the composition of the leachable components follows a continuous function with a maximum and minimum concentration spaced apart on the order of 50 angstroms, the leached inorganic glass film being essentially silica.

2. The semipermeable membrane of claim 1 in which the composition of the inorganic glass film has the following composition: CaO 16 to 19%, MgO 3 to 6%, $Al_2O_3$ 12 to 16%, $SiO_2$ 52 to 56%, and $B_2O_3$ 9 to 11%.

* * * * *